United States Patent
Nagata

(10) Patent No.: US 11,805,196 B2
(45) Date of Patent: Oct. 31, 2023

(54) IN VEHICLE INFOTAINMENT (IVI) HANDS-FREE WITH AUX JACK

(71) Applicant: Toyota Motor Engineering & Manufacturing North America, Inc., Plano, TX (US)

(72) Inventor: Katsumi Nagata, Foster City, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 328 days.

(21) Appl. No.: 17/221,589

(22) Filed: Apr. 2, 2021

(65) Prior Publication Data

US 2022/0321690 A1 Oct. 6, 2022

(51) Int. Cl.
*H04M 1/60* (2006.01)
*B60K 37/02* (2006.01)
*B60R 11/02* (2006.01)

(52) U.S. Cl.
CPC ........... *H04M 1/6083* (2013.01); *B60K 37/02* (2013.01); *B60R 11/0264* (2013.01); *B60R 11/0205* (2013.01); *B60R 11/0217* (2013.01); *B60R 11/0247* (2013.01)

(58) Field of Classification Search
CPC .......... H04M 1/6083; H04M 1/724098; B60K 37/02; B60K 2370/563; B60K 2370/586; B60R 11/0264; B60R 11/0205; B60R 11/0217; B60R 11/0247
See application file for complete search history.

(56) References Cited

U.S. PATENT DOCUMENTS

| 2005/0146227 A1* | 7/2005 | Jackson | H04M 1/6066 307/113 |
| 2007/0281756 A1* | 12/2007 | Hyatt | H02J 7/0042 455/573 |
| 2010/0052613 A1* | 3/2010 | Leung | H02J 7/0045 320/114 |
| 2015/0223064 A1* | 8/2015 | Takemura | B60K 35/00 455/411 |

(Continued)

OTHER PUBLICATIONS

Belkin AV 10172bt03-BLK 3.5mm Cable With Lightning Connector, Black, Smartphone, May 24, 2018, Amazon.com, 10 pages (Year: 2018) (Year: 2018).*

Primary Examiner — Lewis G West
(74) Attorney, Agent, or Firm — SNELL & WILMER LLP

(57) ABSTRACT

A system for using a mobile phone in a vehicle includes an auxiliary jack having multiple conductors and configured to receive a connector having a first end to be coupled to the auxiliary jack and a second end to be coupled to a mobile device. The system further includes a ground coupled to a first conductor of the multiple conductors, and a microphone coupled to a second conductor of the multiple conductors that receives microphone data from a cabin of the vehicle to be transmitted to the remote device via the connector. The system further includes a first speaker coupled to a third conductor of the multiple conductors that outputs audio data received from the third conductor, and an IVI interface configured to receive user instructions for controlling the mobile device and to transmit the user instructions to the mobile device via at least one of the multiple conductors.

20 Claims, 5 Drawing Sheets

(56) References Cited

U.S. PATENT DOCUMENTS

| | | | |
|---|---|---|---|
| 2016/0006858 A1* | 1/2016 | Grover | H04M 1/724098 |
| | | | 455/414.1 |
| 2016/0214621 A1* | 7/2016 | Baalu | H04W 4/70 |
| 2016/0320900 A1* | 11/2016 | Nabe | B60K 37/04 |
| 2017/0048605 A1* | 2/2017 | Kou | H04R 1/1025 |
| 2017/0139556 A1* | 5/2017 | Josephson | H04L 12/2803 |
| 2017/0322935 A1* | 11/2017 | Desai | B60K 37/06 |
| 2018/0248782 A1* | 8/2018 | Scales | H04L 43/50 |
| 2021/0104310 A1* | 4/2021 | Lin | H04L 12/28 |
| 2021/0368954 A1* | 12/2021 | Hicks | A45C 11/00 |
| 2023/0031129 A1* | 2/2023 | Konstantinovsky | |
| | | | G06V 20/593 |

* cited by examiner

IN VEHICLE INFOTAINMENT (IVI) HANDS-FREE WITH AUX JACK

BACKGROUND

1. Field

The present disclosure relates to systems and methods for hands-free control of mobile devices in a vehicle via a direct cable connection between the mobile device and the vehicle.

2. Description of the Related Art

Most of today's vehicles include Bluetooth systems to enable interaction between in-vehicle infotainment (IVI) systems of vehicles and mobile devices (e.g., smartphones) of vehicle users. However, users do not always take advantage of these Bluetooth connections for various reasons. For example, some users believe that the sound of audio transferred via Bluetooth is of inferior quality. Other users may have difficulty establishing the initial Bluetooth connection between the IVI system and the mobile device. Other users may be concerned with security of the Bluetooth connection, especially in rental vehicles.

Many vehicle users who fail to connect their smartphones to the IVI system via Bluetooth may still initiate and receive phone calls. These users are limited in how they use the smartphones. Some users may hold the mobile telephone to their ear, which is illegal in many jurisdictions and is an unsafe practice. Other users may utilize the speaker function of their smartphone; however, these users often also hold the telephone up while doing so which is also illegal and unsafe. If these users do not physically handle the smartphone, the ambient noise in the vehicle (e.g., road noise) makes it difficult for speech to be clearly heard on either end of the telephone connection. Yet other users may utilize a headset connected to the smartphone, which may also be illegal in some jurisdictions and is unsafe because the user may be unable to clearly hear environmental sounds while driving.

Thus, there is a need in the art for systems and methods for connecting mobile devices to IVI systems of vehicles without Bluetooth or other wireless connections.

SUMMARY

Described herein is a system for using a mobile phone in a vehicle. The system includes a 3.5 millimeter (3.5 mm) auxiliary jack having multiple conductors and designed to receive a connector having a first end with a 3.5 mm plug designed to be electrically coupled to the 3.5 mm auxiliary jack and a second end having a mobile device connector designed to be electrically coupled to a mobile device. The system further includes an electrical ground coupled to a first conductor of the multiple conductors. The system further includes a microphone coupled to a second conductor of the multiple conductors and designed to receive microphone data from a cabin of the vehicle such that the received microphone data is transmitted to the remote device via the connector. The system further includes a first speaker coupled to a third conductor of the multiple conductors and designed to output audio data received from the third conductor into the cabin of the vehicle. The system further includes an in-vehicle infotainment (IVI) interface designed to receive user instructions for controlling the mobile device and to transmit the user instructions to the mobile device via at least one of the multiple conductors of the 3.5 mm auxiliary jack.

Also described is a system for using a mobile phone in a vehicle. The system includes a 3.5 millimeter (3.5 mm) auxiliary jack having multiple conductors and designed to receive a connector having a first end with a 3.5 mm plug designed to be electrically coupled to the 3.5 mm auxiliary jack and a second end having a mobile device connector designed to be electrically coupled to a mobile device. The system further includes a microphone coupled to a first conductor of the multiple conductors and designed to receive microphone data from a cabin of the vehicle such that the received microphone data is transmitted to the remote device via the connector. The system further includes a first speaker coupled to a second conductor of the multiple conductors and designed to output audio data received from the second conductor into the cabin of the vehicle. The system further includes a second speaker coupled to a third conductor of the multiple conductors and designed to output audio data received from the third conductor into the cabin of the vehicle. The system further includes an in-vehicle infotainment (IVI) interface designed to receive user instructions for controlling the mobile device and to transmit the user instructions to the mobile device via at least one of the multiple conductors of the 3.5 mm auxiliary jack.

Also described is a method for using a mobile device in a vehicle. The method includes receiving, by a 3.5 millimeter (3.5 mm) auxiliary jack of the vehicle, a first end of a connector having a 3.5 mm plug, a second end of the connector having a mobile device connector designed to be electrically coupled to a mobile device. The method further includes receiving, by an in-vehicle-infotainment (IVI) interface of the vehicle, user instructions for controlling the mobile device. The method further includes transmitting, by the IVI interface, the user instructions to the mobile device via the connector.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for wired interaction between a mobile device (such as a smartphone) and an in-vehicle infotainment (IVI) system of a vehicle. An exemplary system provides benefits and advantages such as allowing a user to communicate during phone calls using a microphone and speaker of the IVI system. This is advantageous because it reduces the likelihood of a vehicle user driving while holding a smartphone, which may be an illegal or dangerous practice. The systems also provide the benefit of allowing the user to control aspects of the mobile device using interfaces of the IVI system, which reduces the likelihood of a user looking away from the road to initiate, receive, or adjust settings of the smartphone while driving; this further increases driver safety. The systems provide additional benefits and advantages such as providing a wired connection between the smartphone and the IVI system, which provides greater signal quality (and thus better-sounding audio data) than a wireless connection such as Bluetooth. The systems further advantageously reduce the likelihood of data being stolen from the mobile device because Bluetooth (which can permit access to the mobile device) may remain off, and an auxiliary port used in the systems provides less access to data on the mobile device than a full Universal Serial Bus (USB) connection between the vehicle and the mobile device.

An exemplary system utilizes an IVI system of the vehicle to control a mobile device of a vehicle user. In particular, the system includes an auxiliary jack (e.g., a 3.5 millimeter (3.5 mm, 0.138 inches) auxiliary jack, i.e., a port that receives or otherwise connects to an auxiliary connector) within the vehicle. The auxiliary jack is designed to receive a 3.5 mm plug on a first end of a connector, the connector having a second end that is connected to the mobile device. The connector is designed to have multiple conductors between the vehicle and the mobile device. In that regard, a first conductor may be coupled to an electrical ground of the vehicle and an electronic ground of the mobile device. A second conductor may be coupled to a microphone of the IVI system to port microphone data from the vehicle to the mobile device. A third conductor may be coupled to a speaker of the IVI system to port audio data from the mobile device to the speaker so that the audio data can be output to the vehicle cabin. The system may further include an IVI interface. The IVI interface may receive user instructions (e.g., via speech data or physical inputs) and may transmit the user instructions to the mobile device via the conductor(s) of the connector for controlling the mobile device.

Figure 1:
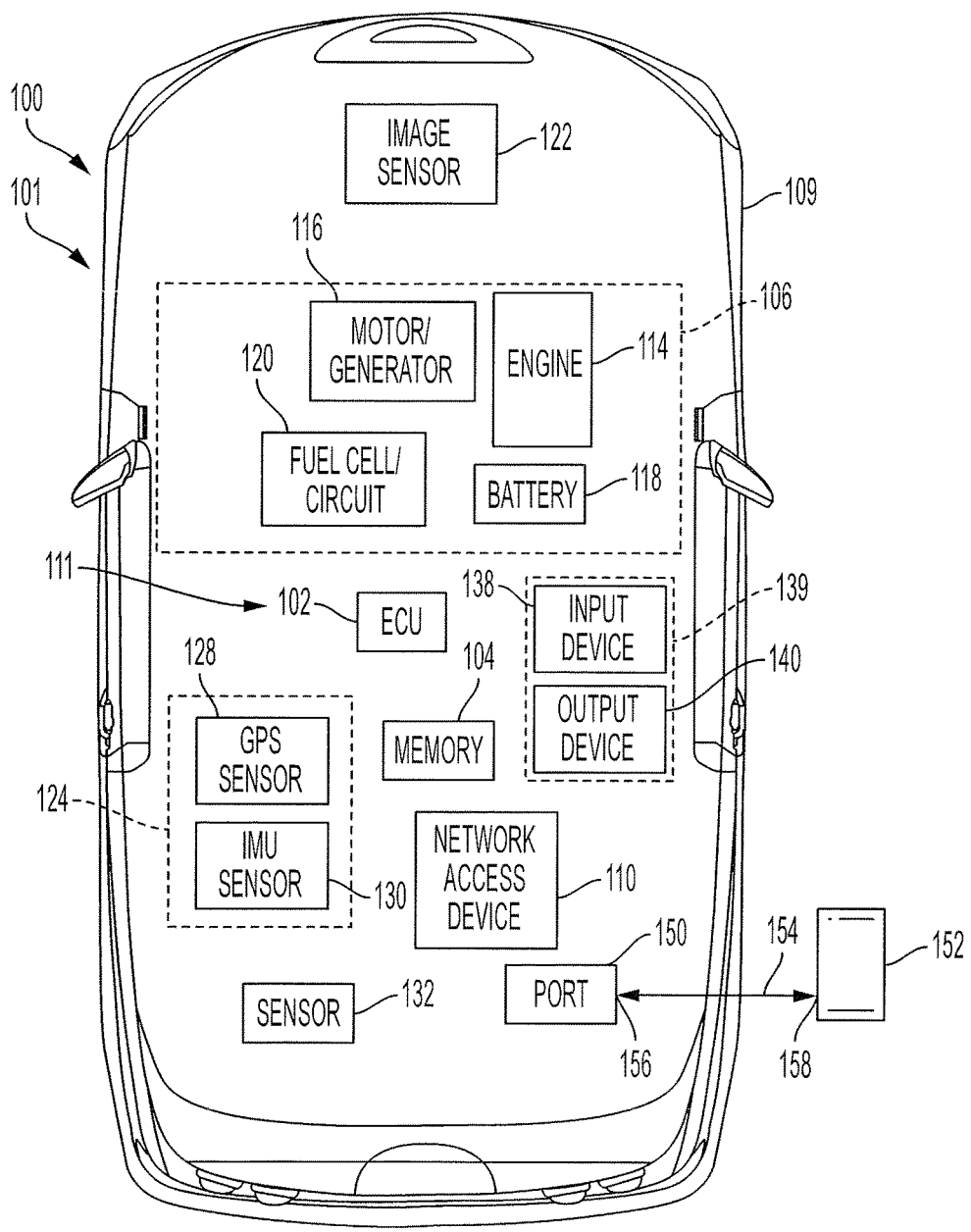
FIG. 1 is a block diagram illustrating a vehicle having a system for wired use of a mobile device in the vehicle according to an embodiment of the present invention.
Figure 2:
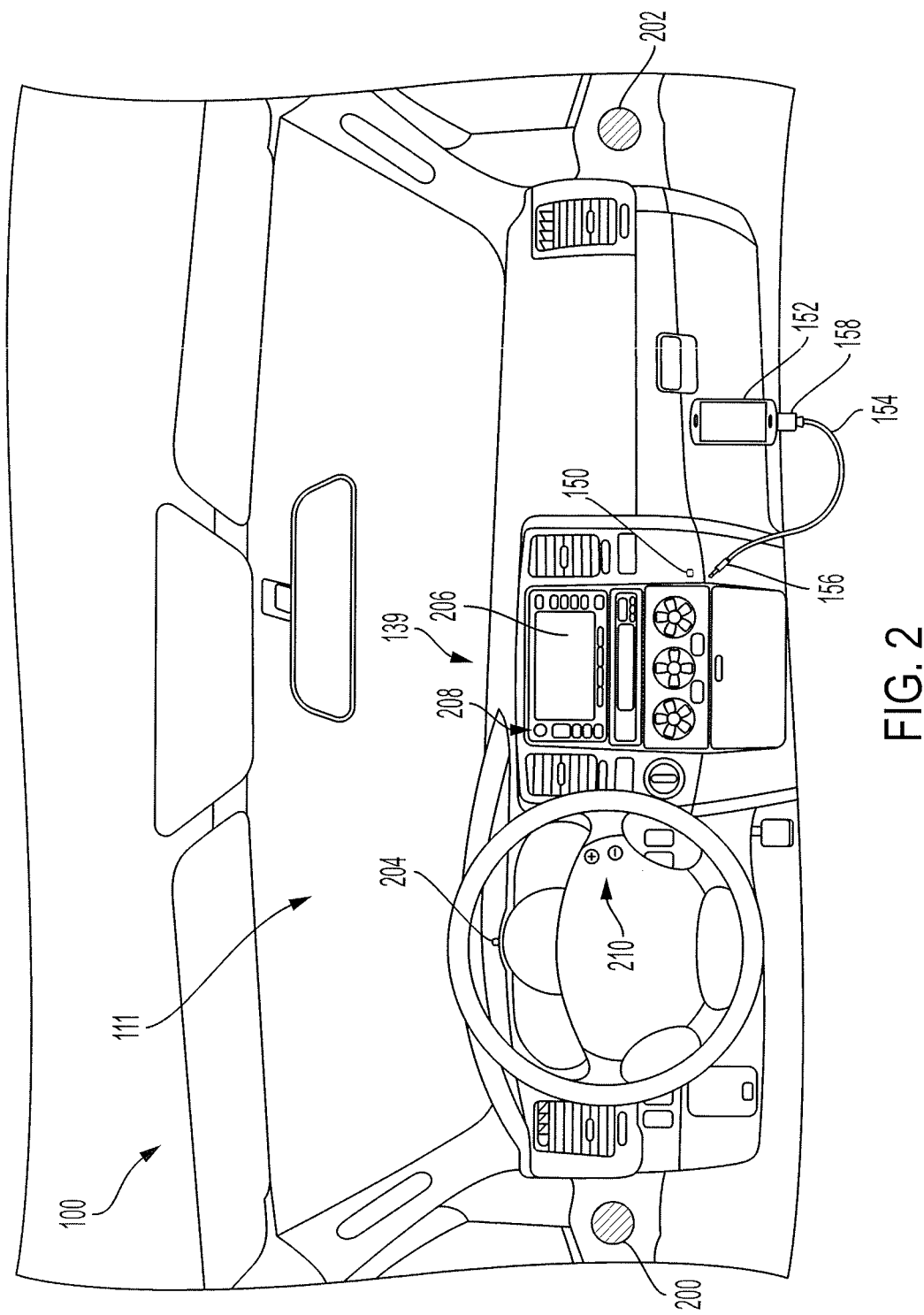
FIG. 2 is a drawing of a vehicle cabin of the vehicle of FIG. 1 according to an embodiment of the present invention.

Turning to FIG. 1, a vehicle 100 may include a system 101 for facilitating a wired connection and control between an in-vehicle infotainment (IVI) interface 139 and a mobile device 152. The vehicle 100 (or system 101) may include an ECU 102, a memory 104, a power source 106, and a main body 109. The vehicle 100 (or system 101) may further include a network access device 110, an image sensor 122, a location sensor 124, and a sensor 132. The vehicle 100 may also include an input device 138 and an output device 140, which together may be referred to as the IVI interface 139. The vehicle 100 may further include a port 150 (e.g., a 3.5 mm auxiliary jack) located in the vehicle 100 and designed to receive a first end 156 of a connector 154 (e.g., a connector having a 3.5 mm plug on the first end 156 and a second end 158 that is designed to be connected to the mobile device 152).

The main body 109 may be propelled along a roadway, may be suspended in or on water, or may fly through air. The main body 109 may resemble a vehicle such as a car, a bus, a motorcycle, a boat, an aircraft, or the like. The main body 109 may further support one or more individual such as a driver, a passenger, or the like. The main body 109 may define or include a vehicle cabin 111 in which a driver, passengers, or the like may be located.

The ECU 102 may be coupled to each of the components of the vehicle 100 and may include one or more processors or controllers which may be specifically designed for automotive systems. The functions of the ECU 102 may be implemented in a single ECU or in multiple ECUs. For example, the ECU 102 may include a power source ECU that controls the power source 106, an IVI ECU that controls the IVI interface 139, or the like. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality. The ECU 102 may also, for example, control various aspects of the mobile device 152 via instructions received from the IVI 139.

The memory 104 may include any non-transitory memory and may store data usable by the ECU 102. The memory 104 may be located in or on the main body 109 and may thus be referred to as a local memory. In some embodiments, the memory 104 may be located remote from the main body 109 and may thus be a remote memory (i.e., memory that is accessed from the cloud via the network access device 110).

The power source 106 may include any one or more of an engine 114, a motor-generator 116, a battery 118, and a fuel cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage devices including a battery, a flywheel, a super capacitor, a thermal storage device, or the like. The battery 118 may be used to store power usable by the motor generator 116, power usable to start the engine 114, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116 or other electrical components of the vehicle 100. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 124 may include any sensor capable of detecting data corresponding to a current location of the vehicle 100. For example, the location sensor 124 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The image sensor 122 may be coupled to the main body 108 and may detect image data corresponding to an environment of the vehicle 100, data corresponding to the vehicle cabin 111, or the like. For example, the image sensor 122 may include a camera, a radar detector, a lidar detector, or any other image sensor capable of detecting light having any wavelength. The image sensor 122 may include one or multiple image sensors which may be oriented to detect image data in any direction relative to the main body 109 (and/or within the vehicle cabin 111). For example, the image sensor 122 may include four or more radar detectors to detect radar data on all four sides of the main body 109. The image sensor 122 may also or instead include a first camera to detect image data in a forward direction relative to the main body 109 and a second camera to detect image data in a rear direction relative to the main body 109.

The sensor 132 may include one or more of a sensor capable of detecting a status of a vehicle component, a sensor capable of detecting environmental conditions (including weather), or the like. For example, the sensor 132 may include a voltage sensor, a current sensor, a temperature sensor, a pressure sensor, a fuel gauge, an airflow sensor, an oxygen sensor, or the like.

The input device 138 may include any one or more input device such as a button, a keyboard, a mouse, a touchscreen, a microphone, or the like. The input device 138 may receive input from a user of the vehicle 100 such as a driver or a passenger. The input device 138 may receive, for example, information corresponding to control of the mobile device 152 (e.g., a request to initiate or answer a phone call), information corresponding to control of the output device 140 (e.g., a request to increase or decrease a volume of audio output by speakers), or the like. The input device 138 may also, for example, receive speech data from a vehicle user (i.e., via a microphone) that corresponds to a telephone call to be transmitted to a remote telephone via the mobile device 152.

The output device 140 may include any output device such as a speaker, a display, a touchscreen, or the like. The output device 140 may output data to a user of the vehicle. The output device 140 may, for example, output audio data received from the mobile device 152 that corresponds to a telephone call between the mobile device 152 and a remote telephone.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wireless protocol. The network access device 110 may be referred to as a data communication module (DCM) and may communicate with any device on the vehicle 100 and/or any remote device.

The system 101 may be used to facilitate control of the mobile device 152 via a wired connection between the auxiliary jack 156 and the mobile device 152. In that regard and referring to FIGS. 1, 2, 3, and 4, additional details of the vehicle 100 (and system 101) are shown. The IVI interface 139 may include a first (e.g., left) speaker 200, a second (e.g., right) speaker 202, a microphone 204, a display 206 (which may or may not include a touchscreen), input buttons 208, and steering wheel input buttons 210. The first end 156 of the connector 154 may include a 3.5 mm plug designed to be received by a 3.5 mm auxiliary jack (e.g., port) 150 of the vehicle 100. In some embodiments, the first end 156 and the jack 150 may be coupled via any other connector so long as the jack 150 is an auxiliary jack of the vehicle 100. The second end 158 of the connector 154 is designed to be connected to the mobile device 152. For example, the second end 158 may include a miniature USB (mini-USB) plug designed to be received by a mini-USB port of the mobile device 152 (e.g., a mobile device running an Android™). As another example, the second end 158 may include a USB-C plug designed to be received by a USB-C port of the mobile device 152. As another example, the second end 158 may include a lightning plug designed to be received by a lightning port of the mobile device 152 (e.g., an Apple® mobile device).

The auxiliary jack 150 may have four conductors that are each designed to electrically contact one of four conductors of the first end 156 (e.g., the 3.5 mm plug) of the connector 154 when the plug 156 is received by the jack 150. In that regard, the auxiliary jack 150 and the connector 154 may comply with at least one of the Cellular Telecommunications and Internet Association (CTIA®) standard or the Open Mobile Terminal Platform (OMTP) standard. With maintained reference to FIGS. 1, 2, 3, and 4, FIG. 3 is a drawing illustrating features of the connector 154 and FIG. 4 is a schematic drawing illustrating features of the auxiliary jack 150.

As an example using the CTIA® standard, a first conductor 308 of the plug 156 is designed to contact a first conductor 400 of the jack 150, a second conductor 310 of the plug 156 is designed to contact a second conductor 402 of the jack 150, a third conductor 312 of the plug 156 is designed to contact a third conductor 404 of the jack 150, and a fourth conductor 314 of the plug 156 is designed to contact a fourth conductor 406 of the jack 150. The second end 158 of the connector 154 may have various conductors or contacts that contact various conductor or contacts within the mobile device 152. In various embodiments, each conductor of the connector 154 may be in contact with a single conductor of the mobile device 152. In some embodiments, one or more conductor of the connector 154 may be in contact with multiple conductors of the mobile device. In that regard, the connector 154 may be wired to route signals from a single conductor at the first end 156 to multiple conductors at the second end 158.

Each of the conductors is designed to communicate various items of information between various components. The first conductor 400 of the jack 150 may be coupled to one or more first speaker 200 and the second conductor 402 of the jack 150 may be coupled to one or more second speaker 202. For example, the first conductors 308, 400 may transmit audio data received from the mobile device 152 to the first speaker(s) 200, and the second conductors 310, 402 may transmit the same or different audio data received from the mobile device 154 to the second speaker(s) 202. The audio data from the mobile device 152 may be monaural (mono) or stereophonic (stereo) audio data. For example, speech data from a phone call via the mobile device 152 may be mono in nature such that the same audio signal (or duplicate audio signals) is transmitted to the first speaker 200 and the second speaker 202. Similarly, music originating from the mobile device 152 may have a first audio signal that is output by the first speaker(s) 200 and a second audio signal that is different than the first audio signal that is output by the second speaker(s) 202, such that the speakers 200, 202 output the conversation or the music in stereo format.

The third conductor 404 of the jack 150 may be coupled to an electrical ground of the vehicle. In that regard, the third conductors 312, 404 may provide a common ground between the mobile device 152 and the vehicle 100.

The fourth conductor 406 of the jack 150 may be coupled to the microphone 204 of the vehicle. For example, the fourth conductors 314, 406 may transmit audio data received from the microphone 204 of the vehicle to the mobile device 152 to be transmitted to a remote telephone during a phone call. The fourth conductors 314, 406 may also or instead transmit audio data received from the microphone 204 to the mobile device 152 for various other reasons, such as audio control of the mobile device 152 (e.g., for use by a digital assistant), recording the audio data by the mobile device 152, or the like.

In some embodiments, the fourth conductor 406 of the jack may also be coupled to the input buttons 208 (or to the steering wheel input buttons 210, to soft buttons on a touchscreen, or to multiple sets of buttons 208, 210). Resistors (R1, R2, R3, R4, etc.) may be located between the buttons 208 and the fourth conductor 406. These resistors may be used to indicate which button a given signal corresponds to. In that regard, the resistors may each have different resistances so the ECU 102 may determine the source button for a given signal. Although discussion is directed to buttons, one skilled in the art will realize that the present disclosure contemplates using any other type of input (such as speech data, a dial or knob, or the like) instead of or in addition to the buttons to trigger a signal requested by a user. The buttons may have different functions associated with them. For example, a first button 408 may correspond to an instruction to increase a volume of the speakers 200, 202, and a second button 410 may correspond to an instruction to decrease the volume. A third button 412 may correspond to an instruction to at least one of initiate, answer, or terminate a phone call. A fourth button 414 may correspond to an instruction to monitor for voice instructions or for a digital assistant (such as Siri®).

In some embodiments, the connector 154 may be wired to route signals from the fourth conductor 406 to multiple conductors at the second end 158, for example, based on an amplitude of the received signal. For example, the connector 154 may determine which buttons have been pressed (or if a signal corresponds to audio data), and may route the corresponding signal to a respective conductor of the mobile device (via the second end 158). In some embodiments, the connector 154 may transmit duplicates of the signal received from the fourth conductor 406 to multiple conductors at the second end 158 such that various portions the mobile device 152 take an action based on an amplitude of the signals.

By connecting the fourth conductor 406 to the input buttons 208, the IVI interface 139 may be used to control various aspects of the mobile device 152. Likewise, the ECU 102 may convert speech instructions received from the microphone 204 into command signals that are transmitted to the mobile device 152 via the fourth conductors 314, 406. The buttons 208 may be soft-switches (e.g., contact locations on a touchscreen of the IVI interface 139 designed to receive user input), may also or instead include dials or knobs (e.g., a dial usable to adjust a volume of audio), input buttons or other input devices located on a steering wheel, or the like. In some embodiments, the ECU 102 may generate a signal to be transmitted to the mobile device 152 via the fourth conductor 406 based on speech data received by the microphone 204. For example, a vehicle user may speak instructions that are received by the microphone 204 (e.g., "increase volume"). The ECU 102 may interpret the instructions and transmit a signal to the mobile device 152 (via the fourth conductor 406) that corresponds to the instructions. For example, the ECU 102 may be aware of amplitudes that the mobile device 152 monitors for various instructions (e.g., to increase or decrease a volume) and may transmit a signal to the mobile device 152 at the specified signal amplitude. The ECU 102 may automatically increase an amplitude of an audio signal received from the mobile device 152 when the mobile device 152 is set to a relatively low volume setting, which may be difficult for a user to detect. Similarly, the microphone setting of the mobile device 152 may be automatically selected by the ECU 102 to adjust the amplitude of audio received by another mobile device connected to the mobile device 152 during a phone call to provide an appropriate audio amplitude.

The buttons 208 (or other related input devices as discussed above) may be used to adjust various features of the mobile device 152. For example, the buttons 208 may be used to initiate a telephone call, answer a telephone call, or hang up a telephone call. The buttons 208 may also or instead be used to play, pause, or stop music that is transmitted from the mobile device 152 to the system 101. The buttons 208 may also or instead be used to adjust a volume of audio transmitted to the mobile device 152 (e.g., via the microphone 204), a volume of audio received from the mobile device 152 (e.g., music or voice call audio), a volume of audio being output by the speakers 200, 202, or the like. The buttons 208 may also or instead be used to skip to a next track, restart the current track, or skip to a next track. The buttons 208 may also or instead be used to fast forward or rewind audio being played from the mobile device 152. The buttons 208 may also or instead be used to initiate a voice command interface of the mobile device 152 (e.g., a digital voice assistant of the mobile device 152).

In some embodiments, the connector 154 may have a control segment 300 located thereon. The control segment 300 may include multiple buttons such as a first button 302 (which may, for example, correspond to a request to increase a volume), a second button 304 (which may, for example, correspond to a request to decrease the volume), and a third button 306 (which may, for example, correspond to requests to initiate, answer, or terminate a phone call). The buttons 302, 304, 306 may be used to perform any function related to control of the mobile device 152 such as adjusting a volume, skipping tracks or fast forwarding/rewinding, or the like.

Figure 4:
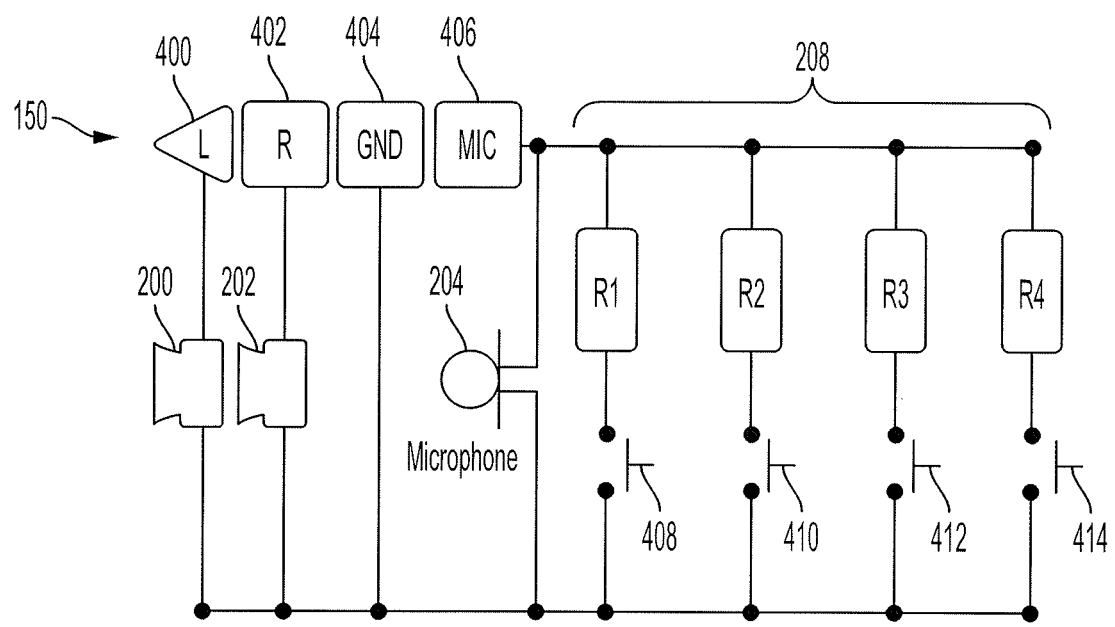
FIG. 4 is a schematic drawing illustrating features of an auxiliary jack of the vehicle of FIG. 1 according to an embodiment of the present invention.
Figure 5:
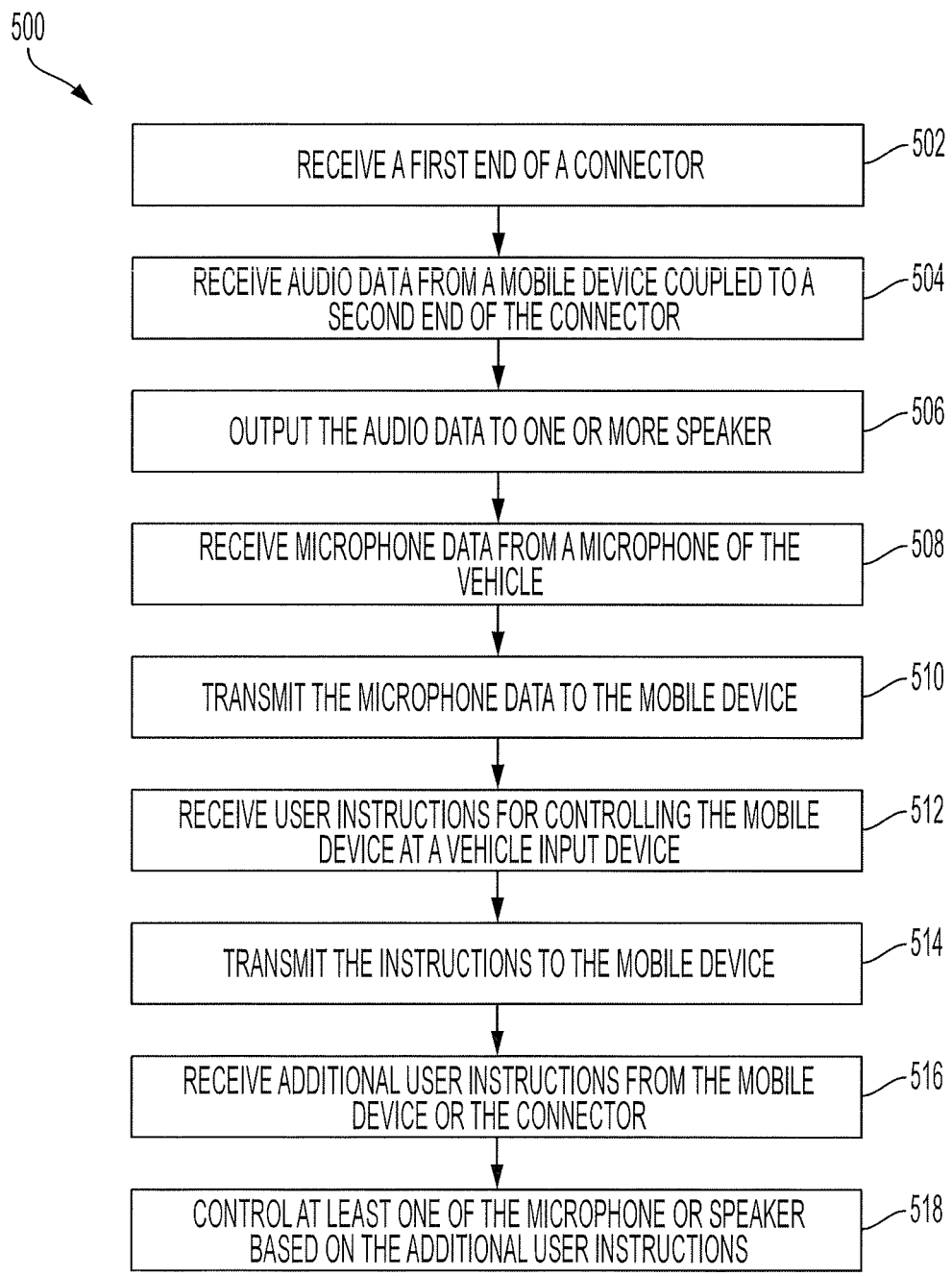
FIG. 5 is a flowchart illustrating a method for wired use of a mobile device in a vehicle according to an embodiment of the present invention.

Turning now to FIG. 5, a method 500 for interfacing between a mobile device and an IVI interface of a vehicle using a wired connection is shown. The method 500 may be performed, for example, by using similar features as the system 101 of FIGS. 1-4. For example, various blocks of the method 500 may be performed by at least one of an ECU, an IVI interface, or other components of the vehicle such as speakers, a microphone, or the like. The ECU may be part of the IVI interface or may be separate from the IVI interface. In some embodiments, the blocks of the method 500 may be performed without use of an ECU (e.g., audio data may be transmitted directly from an auxiliary jack to speakers for outputting without management by an ECU). In some embodiments, the ECU may control which conductors of an auxiliary jack and a connector each item of data is transmitted on, or the data may be hard-wired to be transmitted/received via a certain conductor(s).

The method 500 may begin in block 502. In block 502, an auxiliary jack or port of a vehicle may receive a first end of a 3.5 mm connector. The first end of the connector may include a 3.5 mm plug. The connector may have a second end that is received by, or otherwise mates with, a mobile device (e.g., via a mini-USB connector, a USB-C connector, or a Lightning connector). The second end of the connector may be connected to the mobile device to provide a wired connection between the auxiliary jack of the vehicle and the mobile device. In that regard, the mobile device may be in electrical communication with the IVI interface via the connector.

In block 504, audio data may be transmitted from the mobile device to the IVI interface via the connector. The audio data may correspond to music stored on or streamed to the mobile device, audio received from a remote telephone (e.g., audio from a telephone call), audio from an app located on the mobile device, or the like. The audio may be received at the IVI interface via the connector, for example, along one, two, or more conductors of the first end of the 3.5 mm connector and one, two, or more conductors of the auxiliary jack or port. An ECU of the vehicle may receive the audio data from the IVI interface.

In block 506, the audio data may be output to one or more speaker of the vehicle. For example, the audio data received by two conductors of the auxiliary jack may be output to two separate speakers (e.g., a left speaker and a right speaker may output stereo audio data). The features of the audio data may be controlled using the IVI interface. For example, a vehicle user may use a touchscreen or voice commands in the vehicle to initiate or terminate a phone call, to select an artist and track to play, to skip, fast forward, or rewind tracks, adjust the volume of the audio data, or the like. The user may also be able to control the features of the audio data using input devices on the mobile device. In some embodiments, the user may be able to use input buttons on the connector to adjust the features of the audio data. In some embodiments, the ECU may control the transmission and output of the audio data by the speaker(s). For example, the ECU may monitor the conductors of the connector and may port a signal to or from a respective component of the vehicle. For example, the ECU may receive stereo audio data from two conductors of the auxiliary jack and may port one signal to two left speakers and port the other signal to two right speakers.

In block 508, the IVI interface may receive microphone data from a microphone of the vehicle. The microphone may be located in the vehicle cabin and may include user speech data or any other audio generated in the vehicle cabin. For example, the microphone data may include a vehicle user speaking during a phone call, may include instructions to a digital assistant of the mobile device, or the like. The ECU may receive the microphone data from the IVI interface.

In block 510, the IVI interface may transmit the microphone data to the mobile device via the auxiliary port and the connector. The ECU of the vehicle may control the transmission of the microphone data to the mobile device via the auxiliary port. For example, the ECU may receive the microphone data from the microphone, may apply signal processing to the microphone data for various reasons (or may leave the microphone data as-is), and may transmit the microphone data to the mobile device.

In block 512, an input device of the vehicle (which may be incorporated into the IVI interface) may receive user instructions from a user of the vehicle that correspond to control of the mobile device. The instructions may include any instructions that correspond to usage of the mobile device. For example, if a telephone call is received by the mobile device, an output device of the vehicle may output a notification of the incoming call, and the user may depress a button (or provide speech instructions) indicating that the incoming call should be answered. In a similar manner, the user may provide instructions requesting a new call be initiated or an existing call be terminated, and the IVI interface may provide such control instructions. As yet another example, the user instructions may correspond to music or other audio data stored on the mobile device (e.g., fast forward, skip tracks, start playing music, pause music, or the like).

In some embodiments, the ECU may interpret the user instructions. For example, the ECU may determine that a first button depression corresponds to a request to skip tracks, and that a selection of a soft button on a touchscreen corresponds to a request to answer an incoming call. The ECU may generate signals that are interpretable by the mobile device based on the interpreted user instructions, and may transmit the generated signals to the mobile device via a specified conductor of the auxiliary jack and connector. As referenced above, the ECU may be capable of generating the signals to have a specified amplitude such that the mobile device may interpret the generated signals.

In some embodiments, the IVI interface may output data corresponding to the current status of the mobile device based on at least one of the control instructions or other information received from the mobile device. For example, the IVI interface may output a notification that a certain track of music is being played, or that the mobile device is receiving an incoming call. As another example, the IVI interface may output a list of contacts of the mobile device so the user may select a contact as a recipient of an upcoming call. The IVI interface may also output data corresponding to an existing telephone call (e.g., "the current call has been established for 7 minutes"). As another example, the IVI interface may output data stored on the mobile device such as a list of artists, albums, and tracks stored in the mobile device so the user may select an artist, album, or track for the mobile device to output to the IVI interface. In some embodiments, the IVI interface may not output any data corresponding to the current status of the mobile device.

In block 514, the IVI interface (or the ECU) may transmit the user instructions to the mobile device. The IVI interface may transmit the instructions via one or more conductor of the auxiliary port and the connector. For example and with brief reference to FIG. 4, the IVI interface may transmit the user instructions to the mobile device via the fourth conductor 406 as the mobile device may be designed to receive control instructions via this conductor (e.g., the control instructions may be transmitted to a specific conductor of the mobile device via a specific conductor on the second end of the connector).

After receiving the user instructions, the mobile device may take an action based on the instructions. For example, the mobile device may initiate a call, terminate a call, play music, skip tracks, or the like based on the received instructions.

Figure 3:
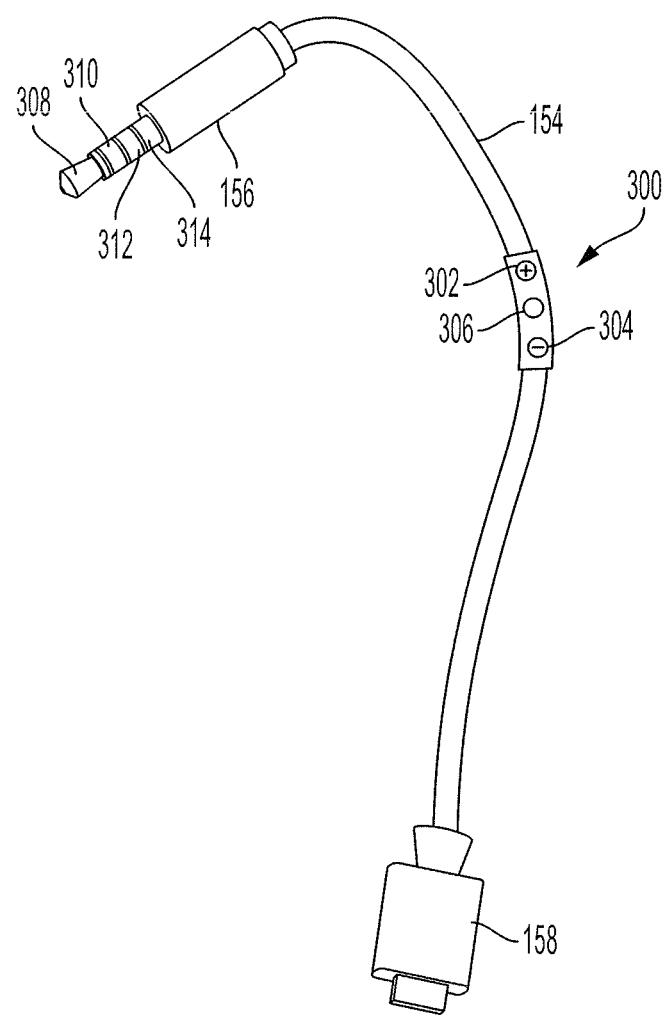
FIG. 3 is a drawing of a connector that connects the vehicle of FIG. 1 to the mobile device of FIG. 1 according to an embodiment of the present invention.

Returning reference to FIG. 5 and in block 516, the user may provide additional user instructions to an input device of the mobile device (e.g., a touchscreen of a smartphone or volume buttons on the smartphone) or the connector (e.g., the control segment 300 of the connector 154 of FIG. 3). These instructions may correspond to any control of the mobile device, or any control of an aspect of the vehicle. For example, the instructions may be to initiate or terminate a call, to adjust a volume of audio from the mobile device, or the like. As another example, the instructions may be to begin listening for speech instructions. The mobile device may interpret the instructions and take an action based thereon (e.g., terminate a phone call). In some embodiments, the mobile device may be capable of interpreting the instructions, generating a signal to be transmitted to the ECU that are interpretable by the ECU, and transmitting the instructions to the ECU via the connector and auxiliary jack.

In block 518, an ECU of the vehicle may control an aspect of the vehicle based on the additional user instructions. If the additional user instructions correspond to a control action to be taken by the mobile device (e.g., to terminate a call) then the ECU may take no action with respect to the additional user instructions. If the additional user instructions correspond to a control action to be taken by either the mobile device or the vehicle (e.g., to adjust a volume of music) then either the mobile device may take the action, the ECU of the vehicle may take the action, or both may take the action. If the additional user instructions correspond to a control action to be taken by the vehicle (which may or may not require action by the mobile device, e.g., to listen for speech instructions) then the ECU may take the control action.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for using a mobile device in a vehicle, the system comprising:
    a 3.5 millimeter (3.5 mm) auxiliary jack having multiple conductors and configured to receive a connector having a first end with a 3.5 mm plug configured to be electrically coupled to the 3.5 mm auxiliary jack and a second end with a mobile device connector configured to be electrically coupled to the mobile device;
    an electrical ground coupled to a first conductor of the multiple conductors;
    a microphone coupled to a second conductor of the multiple conductors and configured to receive microphone data from a cabin within the vehicle such that the received microphone data is transmitted to the mobile device via the connector;
    a first speaker coupled to a third conductor of the multiple conductors and configured to output audio data received from the third conductor into the cabin within the vehicle;
    an in-vehicle infotainment (IVI) interface configured to receive a user input corresponding to one or more user instructions for controlling the mobile device; and
    an electronic control unit (ECU) coupled to the 3.5 mm auxiliary jack and the IVI interface and configured to:
        transmit one or more control signals corresponding, respectively, to the one or more user instructions to the mobile device via at least one of the multiple conductors on the 3.5 mm auxiliary jack,
        receive additional one or more control signals corresponding, respectively, to additional one or more user instructions from the mobile device via the 3.5 mm auxiliary jack, and
        control at least one vehicle feature based on the additional one or more user instructions from the mobile device.

2. The system of claim 1 wherein the IVI interface is configured to transmit the one or more control signals corresponding, respectively, to the one or more user instructions to the mobile device via the second conductor of the multiple conductors.

3. The system of claim 1 further comprising a second speaker coupled to a fourth conductor of the multiple conductors and configured to output audio data received from the fourth conductor such that the first speaker and the second speaker together are configured to output stereo audio data received from the mobile device.

4. The system of claim 1 wherein the microphone and the first speaker are configured, respectively, to receive speech audio from the cabin within the vehicle and to output speech audio into the cabin within the vehicle, the speech audio received from the cabin within the vehicle and the speech audio output into the cabin within the vehicle corresponding to a telephone call made from the mobile device, and the first speaker is configured to output prerecorded audio data stored on the mobile device.

5. The system of claim 1 wherein the IVI interface includes a hands-free interface such that the IVI interface is configured to receive the user input corresponding to the one or more user instructions via the hands-free interface.

6. The system of claim 1 wherein the 3.5 mm auxiliary jack is configured to receive the additional one or more control signals corresponding, respectively, to the additional one or more user instructions from the mobile device, and the IVI interface is further configured to control at least one of the microphone or the first speaker based on the additional one or more user instructions.

7. The system of claim 1 wherein the mobile device connector includes at least one of a mini-USB connector, a USB-C connector, or a Lightning connector configured to be electrically coupled to the mobile device.

8. The system of claim 1 wherein the second conductor is configured to facilitate transmission of the microphone data received from the cabin within the vehicle to the mobile device for use in at least one of a telephone call via the mobile device or as an input to the mobile device.

9. The system of claim 1 wherein the connector has a first connector conductor configured to be in electrical contact with the first conductor of the multiple conductors, a second connector conductor configured to be in electrical contact with the second conductor of the multiple conductors, and a third connector conductor configured to be in electrical contact with the third conductor of the multiple conductors.

10. The system of claim 1 wherein the one or more user instructions received by the IVI interface include at least one of a play instruction, a pause instruction, a volume adjustment instruction, a voice command instruction, a phone call answer instruction, a phone call hang-up instruction, a next track instruction, a previous track instruction, a fast forward instruction, or a rewind instruction.

11. A system for using a mobile device in a vehicle, the system comprising:
- a 3.5 millimeter (3.5 mm) auxiliary jack having multiple conductors and configured to receive a connector having a first end with a 3.5 mm plug configured to be electrically coupled to the 3.5 mm auxiliary jack and a second end with a mobile device connector configured to be electrically coupled to the mobile device;
- a microphone coupled to a first conductor of the multiple conductors and configured to receive microphone data from a cabin within the vehicle such that the received microphone data is transmitted to the mobile device via the connector;
- a first speaker coupled to a second conductor of the multiple conductors and configured to output audio data received from the second conductor into the cabin within the vehicle;
- a second speaker coupled to a third conductor of the multiple conductors and configured to output audio data received from the third conductor into the cabin within the vehicle;
- an in-vehicle infotainment (IVI) interface configured to receive a user input corresponding to one or more user instructions for controlling the mobile device; and
- an electronic control unit (ECU) coupled to the 3.5 mm auxiliary jack and the IVI interface and configured to:
  - transmit one or more control signals corresponding, respectively, to the one or more user instructions to the mobile device via at least one of the multiple conductors on the 3.5 mm auxiliary jack,
  - receive additional one or more control signals corresponding, respectively, to additional one or more user instructions from the mobile device via the 3.5 mm auxiliary jack, and
  - control at least one vehicle feature based on the additional one or more user instructions from the mobile device.

12. The system of claim 11 wherein the IVI interface is configured to transmit the one or more control signals corresponding, respectively, to the one or more user instructions to the mobile device via the first conductor of the multiple conductors.

13. The system of claim 11 wherein the microphone and the first speaker are configured, respectively, to receive speech audio from the cabin within the vehicle and to output speech audio into the cabin within the vehicle, the speech audio received from the cabin within the vehicle and the speech audio output into the cabin within the vehicle corresponding to a telephone call made from the mobile device, and the first speaker is configured to output prerecorded audio data stored on the mobile device.

14. The system of claim 11 wherein the 3.5 mm auxiliary jack is configured to receive the additional one or more control signals corresponding, respectively, to the additional one or more user instructions from the mobile device, and the IVI interface is further configured to control at least one of the microphone or the first speaker based on the additional one or more user instructions.

15. The system of claim 11 wherein the first conductor is configured to facilitate transmission of the microphone data received from the cabin within the vehicle to the mobile device for use in at least one of a telephone call via the mobile device or as an input to the mobile device.

16. A method for using a mobile device in a vehicle, the method comprising:
- receiving, by a 3.5 millimeter (3.5 mm) auxiliary jack on or within the vehicle, a first end of a connector having a 3.5 mm plug, the connector having a second end with a mobile device connector configured to be electrically coupled to a mobile device;
- receiving, by an in-vehicle-infotainment (IVI) interface on or within the vehicle, a user input corresponding to one or more user instructions for controlling the mobile device;
- transmitting, by an electronic control unit (ECU) coupled to the 3.5 mm auxiliary jack and the IVI interface, one or more control signals corresponding, respectively, to the one or more user instructions to the mobile device via the connector;
- receiving, by the ECU, additional one or more control signals corresponding, respectively, to additional one or more user instructions from the mobile device via the 3.5 mm auxiliary jack; and
- controlling, by the ECU, at least one vehicle feature based on the additional one or more user instructions from the mobile device.

17. The method of claim 16 further comprising:
- receiving, by the IVI, audio data from the mobile device via the connector; and
- outputting, by a speaker on or within the vehicle, the audio data received from the mobile device.

18. The method of claim 17 further comprising:
- receiving, at the IVI, microphone data from a microphone on or within the vehicle; and
- transmitting, by the IVI, the microphone data to the mobile device via the connector.

19. The method of 18 further comprising:
- controlling, by the IVI, at least one of the microphone or the speaker based on the additional one or more user instructions from the mobile device.

20. The method of claim 16 wherein receiving the user input corresponding to the one or more user instructions includes receiving the user input via a hands-free interface of the IVI.

* * * * *